UNITED STATES PATENT OFFICE.

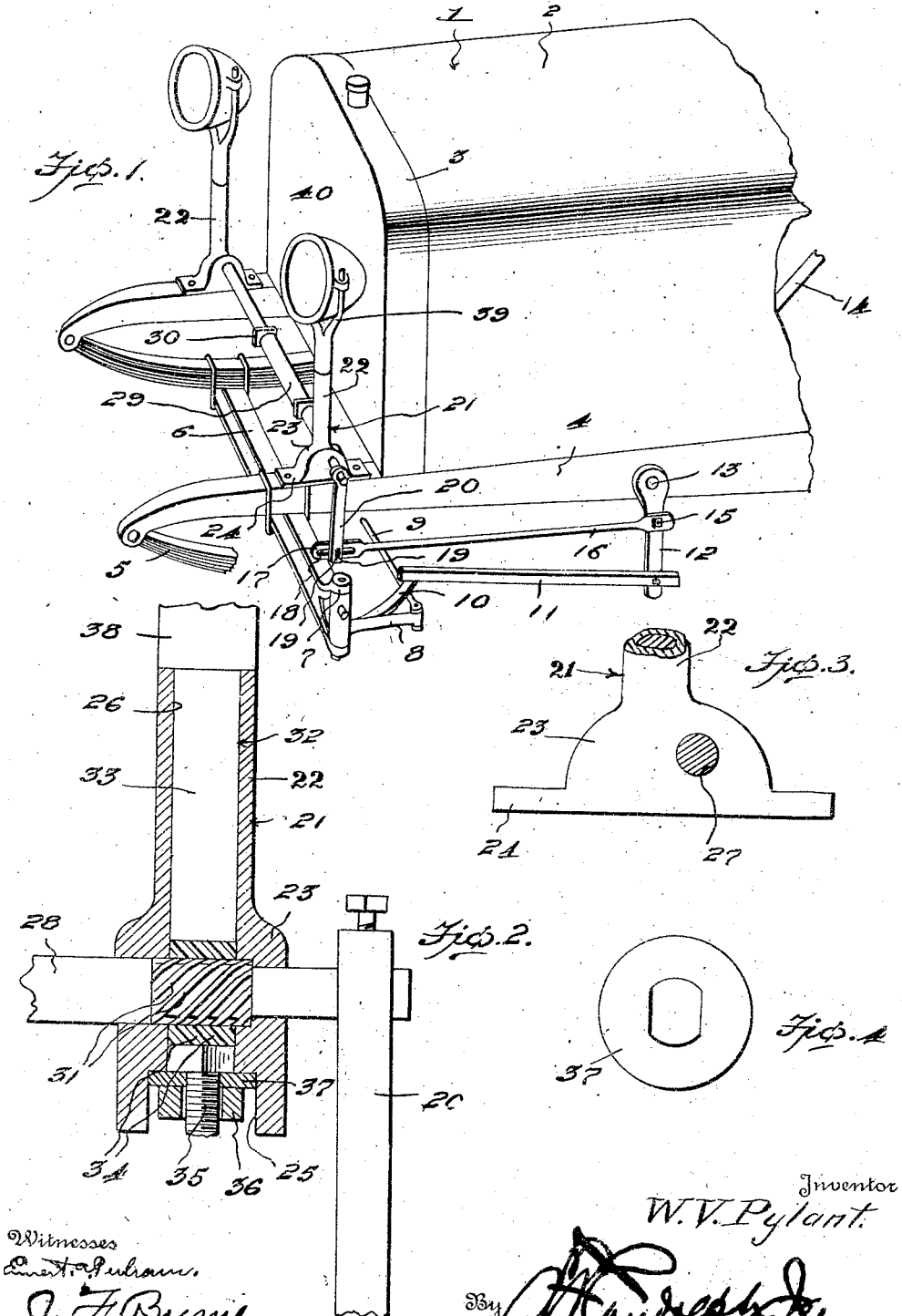

WILLIAM V. PYLANT, OF PETERSBURG, TENNESSEE.

DIRIGIBLE HEADLIGHT.

1,151,591.  Specification of Letters Patent.  Patented Aug. 24, 1915.

Application filed January 15, 1915. Serial No. 2,396.

*To all whom it may concern:*

Be it known that I, WILLIAM V. PYLANT, a citizen of the United States, residing at Petersburg, in the county of Lincoln and State of Tennessee, have invented certain new and useful Improvements in Dirigible Headlights; and I do hereby declare the following to be a full, clear, and exact description of the invention, such as will enable others skilled in the art to which it appertains to make and use the same.

This invention relates to new and useful improvements in dirigible headlights for motor vehicles, and has for its principal object to provide a device which is automatically operated upon movement of the steering wheel.

Another object of the invention is to provide a simple and efficient device which will effectively illuminate the direction in which the vehicle is traveling without in any way requiring the attention of the driver.

A further object of the invention is to provide a novel means for controlling the movement of the light and also to provide a novel and strong support therefor.

With these and other objects in view, the invention consists in the novel combination and arrangement of parts which will be fully set forth in the following specification and accompanying drawings, in which, Figure 1 is a fragmentary perspective view of a motor vehicle showing my improved dirigible headlight secured thereto, Fig. 2 is an enlarged detail fragmentary sectional view of the lower portion of one of the brackets, Fig. 3 is a side view in elevation of one of the brackets showing the operating shaft in section, and Fig. 4 is a plan view of the lock washer.

Referring now to the drawings by characters of reference, the numeral 1 designates as an entirety a motor vehicle of the ordinary construction which is provided with the usual hood 2, radiator 3, chassis 4, springs 5, and front axle 6. This front axle is provided with the ordinary knuckle joints 7, which knuckle joints are provided with the rearward extensions 8 by which the connecting rod 9 controls the movement thereof. A suitable angular extension 10 is formed on one of the knuckle joints and to this extension is pivoted the link 11 which is pivotally secured at its rear end to the downwardly extending arm 12 which is rotatably mounted in the chassis as at 13. The movement of this downwardly extending arm is controlled by the steering column 14 in the usual manner.

Secured as at 15 to the downward extension 12 near its upper end is the link 16, the forward end of which is enlarged as at 17 and slotted as at 18. This slot 18 is designed to receive the bolt 19 which pivotally secures the extension 20 carried by the operating shaft of the light and causes said shaft to rotate.

The light brackets designated generally by the numeral 21 comprise the hollow cylindrical member 22 which is enlarged near its lower end as at 23. This enlargement is provided at its lower terminal with the flanges 24 by which the device may be bolted or otherwise secured to the chassis of the vehicle. The lower end of the enlargement is provided with the enlarged axial bore 25 which communicates with the hollow on the interior of the device as clearly shown in Fig. 2. Extending transversely through the enlargement 23 and to one side of the central bore 26 extending therethrough, is a transverse bore 27 which is designed to form a journal bearing for the operating shaft which will be more fully hereinafter described.

The operating shaft hereinbefore referred to, comprises the sections 28, the meeting ends of which are provided with suitable screw threads on which the turn buckle 29 is operatively connected. A suitable lock nut 30 coöperates with the turn buckle in holding the same in its adjusted position as clearly shown in Fig. 1. The outer ends of the shaft sections 28 are each provided with a plurality of spiral teeth or ribs 31 which are designed to mesh with the lamp supports which will be more fully hereinafter described.

The lamp supports hereinbefore referred to are designated generally by the numeral 32 and each comprises the cylindrical body 33 having formed near its lower end a plurality of spiral teeth or ribs 34 which are designed to engage and mesh with the teeth 31 so that when the teeth 31 are rotated the stem 33 will correspondingly move. A suitable reduced threaded extension 35 is formed at the lower terminal of the stem 33 and a nut 36 is designed to be threaded thereon to hold the device in its proper position. A suitable lock washer 37 is provided and this lock washer is designed to prevent the nut from working loose when the device is in operation. The upper end of the stem 33 is enlarged as at 38 and the upper end of the enlargement is forked as at 39 to form a support for the lamps designated generally by the numeral 40. It will thus be seen that when the operating shaft is rotated, the lamps will also be caused to turn and thereby illuminate the way.

From the foregoing it will be apparent that in use upon turning the steering wheel either to the right or left the downward extension 12 will be moved forwardly or rearwardly as the case may be and this movement will cause the link 16 to pull the arm 20 into the desired direction, which in turn will rotate the operating shaft, thus causing the lamps to turn so that the road to be taken will be illuminated and many accidents eliminated.

While in the foregoing there has been shown and described the preferred embodiment of this invention, it is to be understood that such changes may be made in the combination and arrangement of parts as will fall within the spirit and scope of the invention as defined in the appended claim.

What is claimed is:

The combination with a motor vehicle, of a bracket comprising a hollow cylindrical member, an enlargement at the lower end of the hollow cylindrical member, securing flanges at the lower edge of the enlargement, the enlargement being provided with a transverse opening, a shaft extending through the opening, a reduced extension on the shaft, a spiral gear on the shaft, a lamp support comprising a stem journaled in the hollow cylindrical member, a spiral gear at the lower end of the stem meshing with the spiral gear on the shaft, a reduced threaded extension at the lower end of the stem, a nut threaded on said reduced cylindrical extension, an enlargement at the upper end of the stem, and means for supporting the headlight at the upper end of the enlargement.

In testimony whereof I affix my signature in presence of two witnesses.

WILLIAM V. PYLANT.

Witnesses:
A. O. MARCH,
ED. W. SCOTT.